United States Patent
Patterson

Patent Number: 6,058,925
Date of Patent: May 9, 2000

[54] ADJUSTABLE BARBEQUE GRILL GRID CONSTRUCTION

[76] Inventor: Mack Patterson, 1925 Independence St., Philadelphia, Pa. 19138

[21] Appl. No.: 09/236,033

[22] Filed: Jan. 22, 1999

[51] Int. Cl.[7] .............................. A47J 37/00; A47J 27/00; F24C 1/16

[52] U.S. Cl. .................. 126/25 A; 126/25 R; 126/41 R; 126/9 B; 126/9 R; 99/444; 99/447; 99/421 H; 99/449

[58] Field of Search ................................ 126/41 R, 25 R, 126/214 D, 9 R, 9 B, 25 A; 99/444, 446, 447, 400, 449, 421 H; 108/102, 137

[56] References Cited

U.S. PATENT DOCUMENTS

| | | | |
|---|---|---|---|
| 2,940,381 | 6/1960 | Cottongim et al. | 99/445 |
| 3,288,050 | 11/1966 | Saiki | 99/447 |
| 4,178,844 | 12/1979 | Ward et al. | 99/449 |
| 4,683,867 | 8/1987 | Beatty | 126/41 R |
| 4,762,059 | 8/1988 | McLane, Sr. | 99/445 |
| 4,787,364 | 11/1988 | Zepeda | 126/41 R |
| 4,878,477 | 11/1989 | McLane | 126/41 R |
| 4,886,044 | 12/1989 | Best | 126/39 C |
| 5,000,157 | 3/1991 | Harper, Jr. et al. | 126/41 R |
| 5,121,738 | 6/1992 | Harris | 126/41 R |
| 5,265,586 | 11/1993 | Salerno | 126/41 R |
| 5,363,752 | 11/1994 | Weil | 99/445 |
| 5,650,085 | 7/1997 | Chen | 219/732 |
| 5,761,991 | 6/1998 | Kambies | 99/427 |

*Primary Examiner*—Ira S. Lazarus
*Assistant Examiner*—David Lee
*Attorney, Agent, or Firm*—Henderson & Sturm LLP

[57] ABSTRACT

An adjustable grill grid construction 10 including at least one generally rectangular open framework member 20 having a pair of opposed side channel elements 21, 22 and a centerline brace element 23 provided with a plurality of spaced transverse recesses 24 which are dimensioned to at least partially receive the intermediate portion 33 of a plurality of rod members 30 which are moveable relative to the framework member 20 and adapted to be captively engaged relative to the centerline brace element 23 by a bar clamp member 40 to vary the spacing of the rod members 30 relative to the framework member 20.

7 Claims, 2 Drawing Sheets

ADJUSTABLE BARBEQUE GRILL GRID CONSTRUCTION

BACKGROUND OF THE INVENTION

1. Field of the Invention

The present invention relates to the field of adjustable grill constructions in general, and in particular to a barbeque grill grid construction having a variable grid spacing feature.

2. Description of Related Art

As can be seen by reference to the following U.S. Pat. Nos. 3,288,050; 4,178,844; 5,363,752; 5,650,085; and 5,761,991, the prior art is replete with myriad and diverse adjustable cooking grill constructions.

While all of the aforementioned prior art constructions are more than adequate for the basic purpose and function for which they have been specifically designed, they are uniformly deficient with respect to their failure to provide a simple, efficient, and practical method of varying the lateral spacing of the individual rods that comprise a barbeque grill grid so that both large and very small foodstuffs can be supported on the grid surface.

As anyone who has attempted to cook very small items on a barbeque or rotisserie grill arrangement is all too well aware, the uniform spacing of most conventional cooking grills leaves a lot to be desired due to the fact that very small food items can fall or become trapped between the stationary grid work or in the case of a crowded grid work produce extensive charring of the meat and difficulty in removing larger articles from the grill with the skin attached.

As a consequence of the foregoing situation, there has existed a longstanding need for a new and improved type of adjustable cooking grill grid construction having laterally adjustable grid rods to vary the spacing between adjacent grid rods, and the provision of such a construction is a stated objective of the present invention.

BRIEF SUMMARY OF THE INVENTION

Briefly stated, the adjustable barbeque grill grid construction that forms the basis of the present invention comprises in general, a pair of framework units dimensioned to receive a plurality of rod units which are held in place in the respective framework units by a pair of clamp units and a pair of handle units associated with the opposite ends of the framework units both for varying the vertical spacing between the framework units and to impart rotary motion to the framework units in a rotisserie fashion.

As will be explained in greater detail further on in the specification, the heart of this invention resides in the variable spacing capability of the plurality of rod units relative to the individual framework units and their respective clamp units. The rod units may be closely spaced to one another to support relatively small articles of food and/or widely spaced relative to one another to accommodate large pieces of meat to minimize the charring effect produced by prolonged contact of the heated metal rod units with the surface of the skin and/or flesh of the meat or other cooked article.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
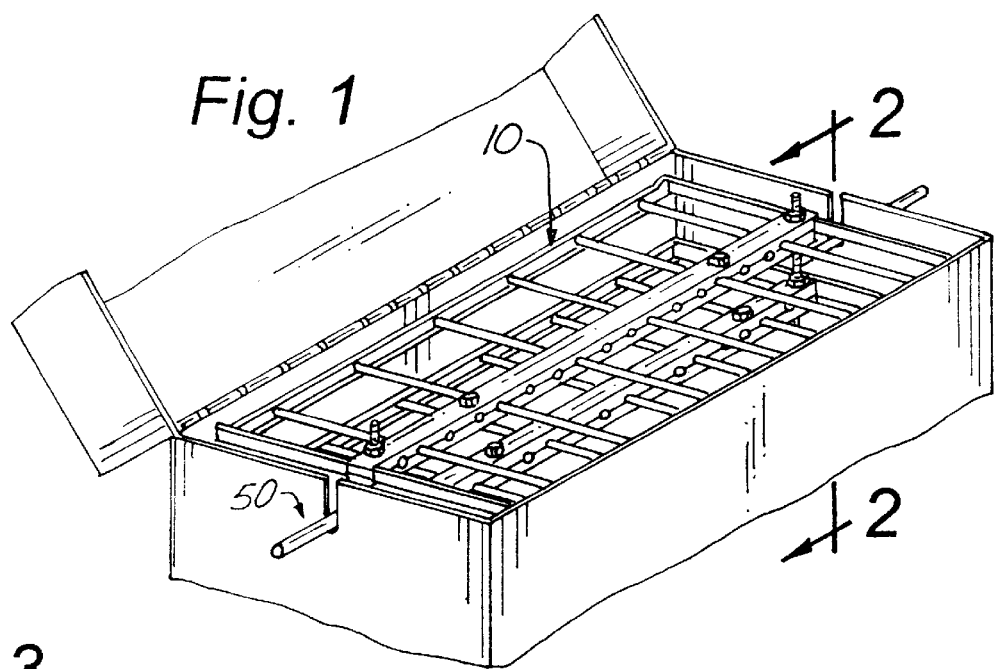
FIG. 1 is a perspective view of the adjustable barbeque grill grid construction that forms the basis of this invention.
Figure 5:
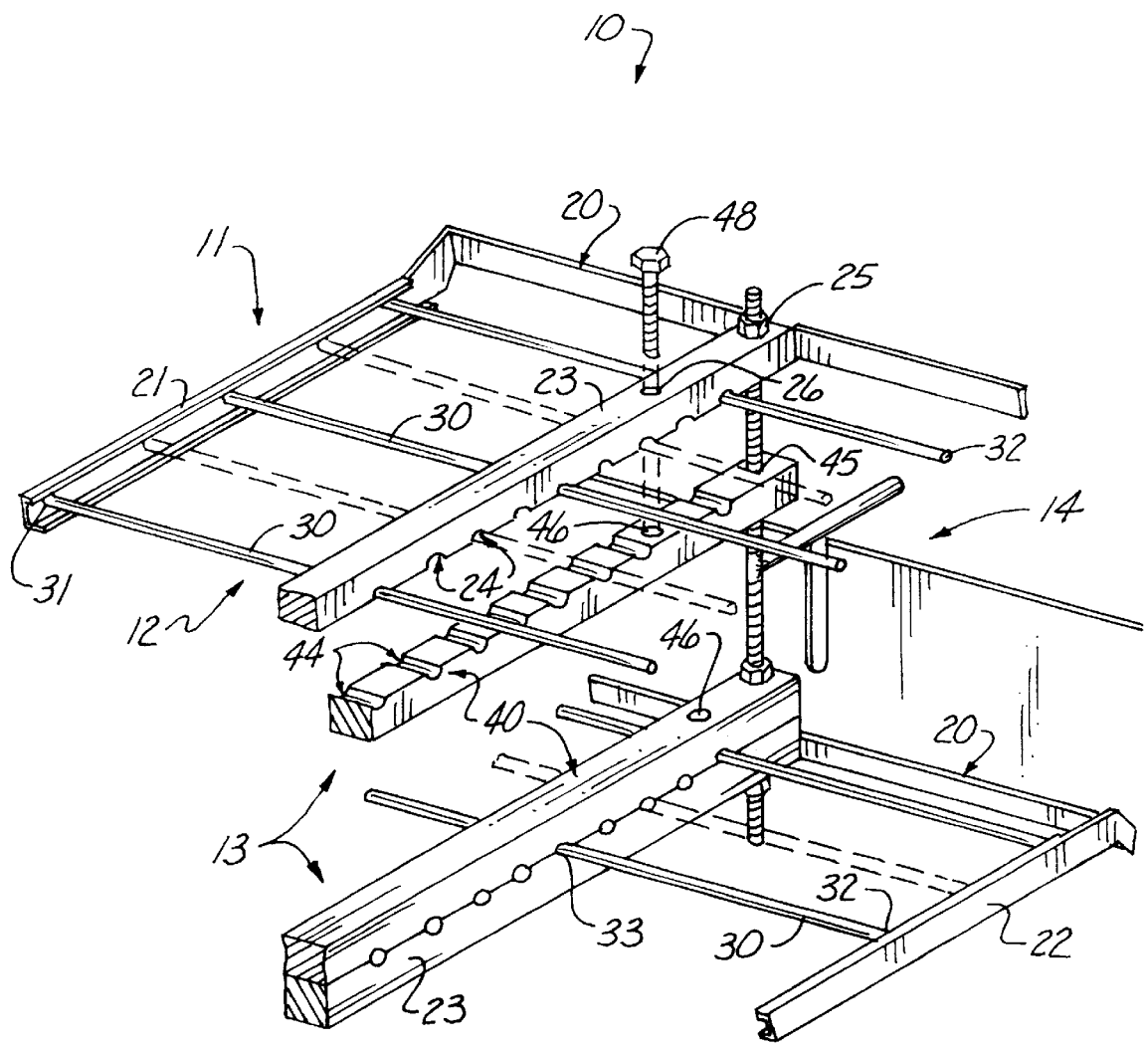
FIG. 5 is an exploded perspective view of a portion of the overall grid construction.

As can be seen by reference to the drawings, and in particular to FIG. 1, the adjustable barbeque grill grid construction that forms the basis of the present invention is designated generally by the reference number 10. Furthermore, as shown in FIG. 5, the construction 10 comprises in general, a pair of framework units 11, a plurality of rod units 12, a pair of clamp units 13, and a pair of handle units 14. These units will now be described in seriatim fashion.

As can best be seen by reference to FIGS. 1 and 5, each of the pair of framework units 11 comprise a generally rectangular open framework member 20 having a pair of opposed side channel elements 21, 22 which face inwardly towards a centerline brace element 23 provided with a plurality of equally spaced transverse semi-circular recesses 24 formed on one of the horizontal surfaces of the centerline brace element 23. The opposite ends of the centerline brace element 23 are provided with one or more mounting apertures 25, 26 whose purpose and function will be described presently.

Figure 3:
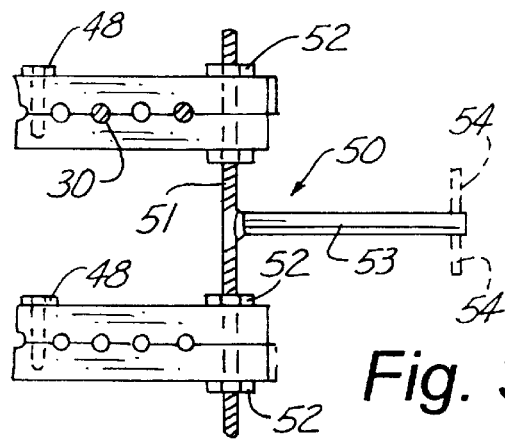
FIG. 3 is a detailed side view of the same end of the construction depicted in FIG. 2.
Figure 4:
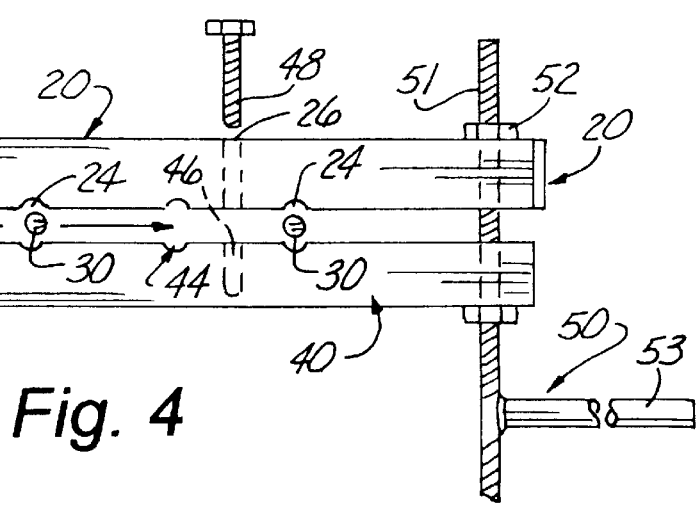
FIG. 4 is an isolated detail view of one end of the upper adjustable grid.

Turning now to FIGS. 3 through 5, it can be seen that the plurality of rod units 12 comprise a plurality of elongated rod members 30 whose opposite ends 31, 32 are dimensioned to be slidably received in the opposed side channel elements 21 of the framework members 20. At least a part of the intermediate portion 33 of the rod members 30 are dimensioned to be received in the plurality of transverse recesses 24 in the centerline brace element 23 of the framework members 20.

Still referring to FIGS. 3 through 5, it can be seen that each of the clamp units 13 comprise an elongated generally rectangular bar clamp member 40 that is almost a mirror image of the framework centerline brace element 23 and is provided with a plurality of equally spaced transverse semi-circular recesses 44 formed none of the horizontal surfaces of the bar clamp member 40 and a plurality of mounting apertures 45, 46. At least one of the apertures 46 is dimensioned to receive a threaded fastening element 48 for securing the bar clamp member 40 to one of the framework members 20 to captively engage the intermediate portion of a number of the plurality of elongated rod members 30 in selected ones of the opposed recesses 24, 44.

By now it should be appreciated that the user of this construction 10 can vary the spacing of the individual rod member 30 relative to the framework members 20 such that closely spaced rod members 30 will support fairly small food items such as shrimp and small chunks of meat. The wider spaced rod members can support large cuts, slabs, or whole carcasses of meat without excessive charring of the exterior surface of the meat from prolonged contact with the heated metal rods 30 as is the case with conventional grill grids having a fixed grid spacing.

Figure 2:
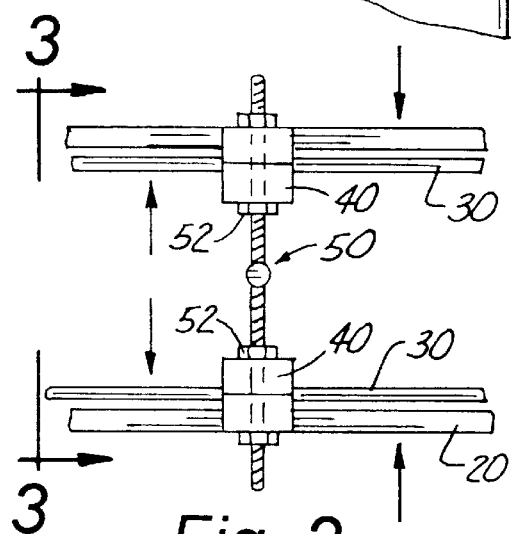
FIG. 2 is a detailed end view of one end of the construction.

Turning now to FIGS. 2 and 3, it cane seen that in the rotisserie version of this invention, a pair of handle units 14 are required both for the purpose joining both of the framework units 11 together to captively engage the pieces of meat that are to be cooked, but also to impart a rotary motion to the assembly to expose both sides of the meat to an even cooking temperature.

Each of the handle units 14 comprise a generally T-shaped handle member 50 wherein the opposite ends of the handle member cross arm 51 are threaded and dimensioned to be received in the mounting apertures 25, 45 in the cross piece brace element 23 and the bar clamp member 40 wherein locking nuts 52 may be used to position the framework members 20 on opposite sides of the handle member cross arm 51 in a well recognized manner.

In addition, the outboard end of the handle member stem 53 may be provided with a pair of opposed stem legs 54 to facilitate the rotational motion of the construction 10 in a likewise well recognized manner.

Although only an exemplary embodiment of the invention has been described in detail above, those skilled in the art will readily appreciate that many modifications are possible without materially departing from the novel teaching and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

What is claimed is:

1. An adjustable grill grid construction comprising:

at least one framework unit including a generally rectangular open framework member provided with a centerline brace element having a plurality of equally spaced transverse recesses formed along the length of said brace element;

a plurality of rod units including a plurality of elongated rod members movably disposed in an independent fashion relative to said framework member and dimensioned to be at least partially received in said plurality of transverse recesses; and means for captively engaging said plurality of rod members in selected ones of said plurality of recesses for selectively varying the spacing between said plurality of rod members.

2. The construction as in claim 1 wherein the framework member is further provided with a pair of opposed side channel elements which are dimensioned to slidably receive the opposite ends of said plurality of rod members.

3. The construction as in claim 2 wherein said means for captively engaging said plurality of rod members includes a bar clamp member provided with a plurality of spaced transverse recesses dimensioned to at least partially receive said plurality of rod members wherein said bar clamp member is adapted to be releasably connected to said centerline brace element.

4. An adjustable grill grid construction comprising:

a pair of framework units wherein each framework unit includes a generally rectangular open framework member provided with a centerline brace element having a plurality of spaced transverse recesses formed along the length of said brace element;

a plurality of rod units including a plurality of elongated rod members movably disposed in an independent fashion relative to both of the framework members and dimensioned to be at least partially received in said plurality of recesses in both of said brace elements;

first means for captively engaging said plurality of rod members in selected ones of said plurality of recesses in both of said centerline brace elements for selectively varying the spacing between said plurality of rod members; and second means for connecting said pair of framework units together in a vertically adjustable fashion.

5. The construction as in claim 4 wherein said first means includes a pair of clamp units wherein each clamp unit is operatively associated with one of said brace elements and includes a bar clamp member provided with a plurality of spaced transverse recesses dimensioned to at least partially receive a number of said plurality of rod members.

6. The construction as in claim 5 wherein the opposite ends of said centerline brace elements are provided with mounting apertures and wherein said second means for connecting said pair of framework units together includes a pair of T-shaped handle members wherein the cross piece of each handle member is dimensioned to be received in the opposed mounting apertures on one end of both framework units.

7. The construction as in claim 4 wherein each framework member is provided with a pair of opposed side channel elements which are dimensioned to slidably receive the opposite ends of said plurality rod members.

* * * * *